United States Patent
Kondoh et al.

(10) Patent No.: US 6,886,115 B2
(45) Date of Patent: Apr. 26, 2005

(54) STRUCTURE RECOVERY SYSTEM, PARSING SYSTEM, CONVERSION SYSTEM, COMPUTER SYSTEM, PARSING METHOD, STORAGE MEDIUM, AND PROGRAM TRANSMISSION APPARATUS

(76) Inventors: Goh Kondoh, 5-28-11-207 Fukasawa, Setagaya-ku, Tokyo-to (JP); Shinichi Hirose, 6-6-16 Takasago, Katsushika-ku, Tokyo (JP)

( * ) Notice: Subject to any disclaimer, the term of this patent is extended or adjusted under 35 U.S.C. 154(b) by 517 days.

(21) Appl. No.: 10/002,762

(22) Filed: Oct. 24, 2001

(65) Prior Publication Data

US 2002/0078406 A1 Jun. 20, 2002

(30) Foreign Application Priority Data

Oct. 24, 2000 (JP) .................................... 2000-323823

(51) Int. Cl.[7] .............................................. G06F 11/00
(52) U.S. Cl. ........................................ 714/52; 715/533
(58) Field of Search ..................... 714/52, 20; 715/533

(56) References Cited

U.S. PATENT DOCUMENTS 5,678,053 A * 10/1997 Anderson ..................... 704/1
2002/0032709 A1 * 3/2002 Gessner ..................... 707/540
2002/0078106 A1 * 6/2002 Carew et al. ............... 707/533
2002/0087604 A1 * 7/2002 Bernth et al. ............... 707/533
2002/0128819 A1 * 9/2002 Jessee et al. ................ 704/10
2003/0037077 A1 * 2/2003 Brill et al. .................. 707/533

* cited by examiner

Primary Examiner—Bryce P Bonzo
(74) Attorney, Agent, or Firm—Richard M. Goldman

(57) ABSTRACT

A system is provided for preparing multiple recovery devices in accordance with the types of tokens in data strings, such as in programs or in documents, and the types of syntax rule errors, and for selectively employing recovery devices to correct errors. A structure recovery system comprises: a parser 20 for analyzing the structure of a data string written in accordance with a predetermined rule and for detecting an error in accordance with the predetermined rule; and a recovery device, independent of the parser 20, for, upon the receipt of a request from the parser 20, correcting in accordance with the predetermined rule the error detected in the data string by the parser 20, wherein the recovery device includes a set of syntax recovery units 22 that individually employ simple functions for correcting specific types of errors, and wherein the recovery device selectively employs the syntax recovery units 22 in accordance with the error type according to the predetermined rule, in order to correct a variety of errors in a data string.

15 Claims, 14 Drawing Sheets

Analysis results for document B without error correction by syntax recovery unit

```
<table>
    <TBODY>
        <tr>
            <td>
                <form action="./invention1.html">
                    <input name="input1" size=5>
                    <input type="submit">
        <tr>
            <form>
                <td>
                    <select>
                        <option>
                        <option>
<table>
    <TBODY>
        <tr>
            <td>
                <select>
                    <option>
                    <option>
```

Fig. 5

Analysis results for document A obtained using FormExpander

```
<table>
    <TBODY>
        <tr>
            <form action="./invention1.html">
                <td>
                    <input name="input1" size=5>
                <td>
                    <input type="submit">
```

Fig. 6

Analysis results for document A obtained using FormInserter

```
<table>
    <TBODY>
        <tr>
            <td>
                <form action="./invention1.html">
                    <input name="input1" size=5>
            <td>
                <FORM>
                    <input type="submit">
```

Fig. 8

Analysis results for document B obtained using FormInserter

- \<table>
  - \<TBODY>
    - \<tr>
      - \<td>
        - \<form action="./invention1.html">
          - \<input name="input1" size=5>
          - \<input type="submit">
    - \<tr>
      - \<form>
        - \<td>
          - \<select>
            - \<option>
            - \<option>
- \<FORM>
  - \<table>
    - \<TBODY>
      - \<tr>
        - \<td>
          - \<select>
            - \<option>
            - \<option>

Fig. 9 str0 str1 *str2* str3 str4

Fig. 14 str0 str1 *str2* *str3* str4

Fig. 15

STRUCTURE RECOVERY SYSTEM, PARSING SYSTEM, CONVERSION SYSTEM, COMPUTER SYSTEM, PARSING METHOD, STORAGE MEDIUM, AND PROGRAM TRANSMISSION APPARATUS

BACKGROUND OF THE INVENTION

1. Field of the Invention

The present invention relates to a technique for analyzing tokens and the syntax of programs and documents written in accordance with a predetermined rules, and for correcting errors.

2. Related Art

As techniques for correcting errors in programs or documents written in accordance with predetermined rules, there are a number that detect errors by analyzing program or document tokens and the syntaxes of data strings. A conventional technique of this type uses the following two methods to handle errors.

According to the first method, a warning is issued upon the detection of an error, and the analysis is either halted or it is resumed at a synchronization point following the location of the error. That is, according to this method, errors are not aggressively corrected to recover to a normal state. This method is widely employed for cases wherein the processing system in a programming language does not permit the analyzation of errors in documents, or for analysis systems that are developed as general applications that are not part of specific programs.

The XML (Extensible Markup Language) processing system will now be explained. For XML, general structure analysis systems that do not depend on an application are provided by several vendors (for example, OpenXML by Open XML Corp. or XML4J by IBM Corp.). When an error is detected in a document, these processing systems either abandon the analysis, or ignore the error in the token and resume the process at a synchronization point at a location following the error. Before the processing is continued, an external module ErrorHandler can receive error location data and an explanatory message through an interface (SAX: Simple API for XML) that operates the parsing system. However, this module only receives a warning, and does not provide a function for changing the state of the parsing system and the output results.

According to the second method, analysis results are output based on a special recovery method corresponding to the application that is employing the analysis system, and the analysis is continued. That is, according to this method, as part of an error reduction process, not only are errors detected, but also, corrective action is initiated to correct the errors and to provide a program or document that is free of syntax rule violations. This method is employed for a case wherein the person who reads a source document is not the person who created it, and wherein the reader is tasked with generating output results regardless of whether the document contains errors.

The HTML (HyperText Markup Language) processing system will now be explained. Since the person who creates an HTML document for a web page on the Internet usually differs from the person who browses it, when a syntax rule error is present in an HTML document, merely noting the presence of the error in the document that is to be read by a browser is insufficient, and a state must be attained wherein a user who browses the HTML document does not have to contend with errors. Therefore, some web browsers (web browsing software applications) include functions for analyzing tokens and syntax and for correcting HTML rule errors, and are thus able to provide errorless documents for users.

Assume that in a predetermined HTML document there is a portion <P>str0<B>str1<I>str2</B>str3</I>str4</P>. Since tags <B></B> and <I></I> in this portion are not nested structures, this is a syntax rule error. In order for a web browser to display this portion, the error must be corrected, so that the parsing means of the web browser can generate data for output.

Netscape Navigator by Netscape Communications Corp., which is a representative web browser, corrects the above portion as follows:

<P>str0<B>str1<I>str2</I>str3</B>str4</P>

That is, a nested structure is fabricated by exchanging </B> and </I>, which provides the output results shown in FIG. 14 (str1 and str3 are bold and str2 is italic and bold).

On the other hand, Internet Explorer by Microsoft Corp., which is another representative web browser, corrects the above portion as follows:

<P>str0<B>str1<I>str2</I></B><I>str3</I>str4</P>

That is, a nested structure is fabricated by inserting </I> before </B> and <I> after </B>, which provides the output results shown in FIG. 15 (str1 is bold, str2 is italic and bold and str3 is italic).

FIG. 12 is a diagram showing the configuration of a conventional parsing system, and FIG. 13 is a flowchart for explaining the parsing process performed by the parsing system in FIG. 12.

In FIG. 12, a parsing system 120 comprises: a lexical analyzer 121, for receiving a predetermined stream included in an input document and analyzing tokens; a parser 122, for analyzing the syntax of the token obtained by the lexical analyzer 121, and for generating and outputting an abstract syntax tree (AST) that describes the structure of the input document; and a node generator 123, which is used to generate the abstract syntax tree. The lexical analyzer 121 includes a buffer 121a, which is used for the token analysis, and a token recovery unit 121b, for correcting token errors. The parser 122 includes a buffer 122a, which is used for syntax analysis, a context pointer and a syntax recovery unit 122b, for correcting syntax rule errors. When the process is initiated by the parser 122, a grammar information object 124 is generated that is used for the parsing.

As is shown in FIG. 13, when the parsing process is initiated, first, the parser 122 is initialized (step 1301). For this initialization, the following three steps are performed: ① the document type of the input document is analyzed, and a grammar information object 124 is generated; ② the buffer 122a is emptied; and ③ the context pointer is used to represent the root node of the abstract syntax tree. Note that before the parser 122 is initialized the input of the token stream and the token analysis are completed.

Then, the parser 122 extracts the token from the buffer 122a as a token t to be processed (step 1302). When the buffer 122a is empty (it is always empty immediately after the initialization at step 1301), a token is requested from the lexical analyzer 121, and the obtained token is defined as the token t. When the token t is the terminal one of the input document, the generated abstract syntax tree is output and the processing is thereafter terminated (step 1303).

When the token t is not the end of the input document, the parser 122 inquires, of the grammar information object 124, whether the token t grammatically matches the context pointer. When the token t matches, the token t is added to the context pointer (Yes at step 1304). This addition is performed in the following manner. First, a node n, which is a non-terminal symbol, is generated by the node generator 123 and is added to the context pointer (step 1305). Then, the destination of the context pointer is shifted to the non-terminal symbol node n that has newly been added (step 1306). When the non-terminal symbol node n pointed to by the context pointer has obtained all the child nodes, the context pointer is shifted to the parent node (steps 1307 and 1308). If the non-terminal symbol node n indicated by the context pointer has not obtained all the child nodes, or if the context pointer is shifted to the parent node at step 1308, program control returns to step 1302, whereat the next token is obtained and the previous processing is repeated.

When, at step 1304, the token t does not grammatically match the context pointer, the parser 122 outputs an error message (step 1309) And after a predetermined error process has been performed (step 1310), program control is returned to step 1302 and the next token is obtained and processed. The error process includes processing whereby the pertinent token t is skipped and a subsequent token is processed, and recovery processing that employs a fixed method. For the recovery processing, the parser 122 calls the syntax recovery unit 122b to correct the error, so that the token t grammatically matches the context pointer. Thereafter, program control is returned to step 1302.

This recovery process can be performed because parsing systems 120 (such as the parsing means provided for a web browser) have been especially developed for HTML and for applications. Example parsing systems are Ark, by Just System Corp., and W3C Tidy, by W3C (World Wide Web Consortium).

In the above example operation, while the lexical analyzer 121 analyzes a token, the token recovery unit 121b corrects errors in the token. Since this is a simple process of replacing a token in the input stream with an appropriate token fabricated in accordance with a predetermined rule, no explanation for this will be given.

SUMMARY OF THE INVENTION

As is described above, so long as parsing systems are provided for specific programming languages employed for program or document preparation, a predetermined program or document, prepared using a pertinent language, that contains syntax rule errors can be corrected and an errorless state can be recovered.

However, multiple, standardized methods are provided for correcting errors in documents and for recovering to normal documents. Therefore, since for an HTML document, for example, conventional syntax parsing systems employ fixed methods when correcting specific errors, after the errors in a document have been corrected, the result may not always reflect the intent of the document's creator.

Thus, it is preferable that applications for correcting errors in documents include not only methods defined by the creators of analysis systems, but also methods that are user defined, and that, under various conditions, the selective employment of error correction methods be a user prerogative.

It is, therefore, one object of the invention to provide a system for preparing multiple recovery means in accordance with the types of tokens in data strings, such as in programs or in documents, and the types of syntax rule errors, and for selectively employing recovery means to correct errors.

To achieve the above object, according to the invention, a structure recovery system comprises: analysis means for analyzing the structure of a data string written in accordance with a predetermined rule and for detecting an error in accordance with the predetermined rule; and recovery means, independent of the analysis means, for, upon the receipt of a request from the analysis means, correcting in accordance with the predetermined rule the error detected in the data string by the analysis means, wherein the recovery means includes a set of correction means that individually employ simple functions for correcting specific types of errors, and wherein the recovery means selectively employs the correction means based on the error type in accordance with the predetermined rule in order to correct a variety of errors in the data string.

Therefore, correction means are prepared, added or changed, or an unnecessary correction means is deleted, in accordance with the type of target data string or the type of error, so that various data strings and various errors can be flexibly coped with, and errors can be appropriately corrected.

The present invention can be especially employed for the parsing of a program or a document. In this case, according to this invention, a parsing system, for performing the parsing of a data string written in accordance with a predetermined rule, comprises: a parser for performing a parsing process; and a syntax recovery unit for, upon the receipt of a request from the parser, correcting an error detected by the parser in the data string, wherein the syntax recovery unit is provided independent of the parser, and can change the contents of a correction.

Multiple types of the syntax recovery units are prepared in accordance with the types of errors that are detected by the parser in the data string, and each of the syntax recovery units has a function for correcting a specific type of error.

Therefore, an error can be appropriately and flexibly corrected by adding, changing or deleting a syntax recovery unit.

The parsing system, as means for employing the appropriate syntax recovery unit, further comprises: corresponding information storage means for storing information that correlates the type of data string with a syntax recovery unit for recovering from an error in the data string, wherein, in accordance with the type of target data string, the parser employs the information stored in the corresponding information storage means to set up the syntax recovery unit for the correction of an error upon the receipt of a request.

A table wherein identifiers (IDs), for identifying the type of data string, and corresponding syntax recovery units are registered can be used as the corresponding information storage means.

Furthermore, when the target data string includes an element that is not defined by a rule that the parser employs for the parsing process, at least one of the syntax recovery units is activated and performs a process for replacing the rule used by the parser with a rule that defines the element in the target data string, and for returning the target data string to the parser.

The parsing system can be configured in the same way for the token analysis. Specifically, the parsing system further comprises: a lexical analyzer, for performing token analysis for the target data string; and a token recovery unit, for correcting an error detected by the lexical analyzer in the token in the data string, wherein the token recovery unit is provided independent of the lexical analyzer, and can change the contents of a correction.

Multiple types of the token recovery units are prepared in accordance with the type of error that is detected by the lexical analyzer in the data string, and each has a function for correcting a specific type of error.

Therefore, an error in a token can also be appropriately and flexibly corrected.

According to the invention, a data conversion system having the above described parsing system can also be provided.

In addition, a computer system for implementing the above parsing system or data conversion system can be provided.

Furthermore, according to the invention, a program product can be prepared that permits a computer to implement the above parsing system, and a storage medium for storing such a program product, or a transmission apparatus for transmitting the program product via a network, can be provided.

According to the invention, a parsing method for parsing a data string written in accordance with a predetermined rule comprises the steps of: selecting a program module used to correct an error in a target data string in accordance with a syntax rule; parsing the data string; issuing a correction request to the program module when the parsing detects an error in accordance with the syntax rule in the data string; and correcting the error using the program module, and parsing the obtained data string.

The step of selecting a program module for use includes the steps of: examining the type of the target data string; and employing the type of the target data string to select the program module based on a correlation that is defined in advance.

The parsing method further comprises the step of: replacing, upon the receipt of an instruction from the program module to which the correction request has been issued, a rule used for the parsing with a different rule, wherein, at the step of performing the parsing for the resultant data string, the parsing is performed for the data string written in accordance with the different rule.

BRIEF DESCRIPTION OF THE DRAWINGS

FIG. 5 is a diagram showing another abstract syntax tree that is obtained when the parser has performed the parsing process and a syntax recovery unit has not been used to correct an error.

FIG. 6 is a diagram showing an abstract syntax tree that is obtained when the parser has performed the parsing process and one syntax recovery unit has been used to correct an error.

FIG. 8 is a diagram showing an abstract syntax tree that is obtained when the parser has performed the parsing process and another syntax recovery unit has corrected an error.

FIG. 9 is a diagram showing another abstract syntax tree that is obtained when the parser has performed the parsing process and a syntax recovery unit has been used to correct an error.

FIG. 14 is a diagram showing an HTML document corrected by the conventional parsing system.

FIG. 15 is a diagram showing another HTML document corrected by the conventional parsing system.

DESCRIPTION OF THE PREFERRED EMBODIMENTS

The preferred embodiment of the invention will now be described while referring to the accompanying drawings.

An overview of the invention will be presented first. In this invention, for a parsing system used for converting into another form a data string, such as a program or a document, that is written in accordance with a predetermined rule, means for correcting a token or an error in accordance with a syntax rule is provided independent of token analysis means and parsing means (jointly referred to, hereinafter, simply as analysis means when the two are not especially distinguished), and multiple recovery means, each of which has a simple correction function for an error type, are prepared. When an error is found by the token analysis means and the parsing means, the recovery means group is requested to perform the recovery process.

Upon the receipt of a processing request, the output results obtained by the analysis means and a buffer are employed based on the error type and the token or the character string whereat an error was detected. Since the multiple recovery means are provided independent of said analysis means, recovery means can be added or deleted.

The recovery process performed by these multiple recovery means may not be independent. Specifically, while a string of predetermined recovery means (a combination of several recovery means) can be employed for the recovery of a specific document, this recovery means string will probably not be useful for another document and a string composed of a different combination of recovery means will have to be employed. In order to cope with this, the correlation between an identifier for a predetermined document and an error recovery means string required for the analysis of the document is stored. Then, when the analysis process is to be performed for the predetermined document, the correlation is retrieved, and based on it, recovery means that correspond to the document are assembled into a string.

Figure 1:
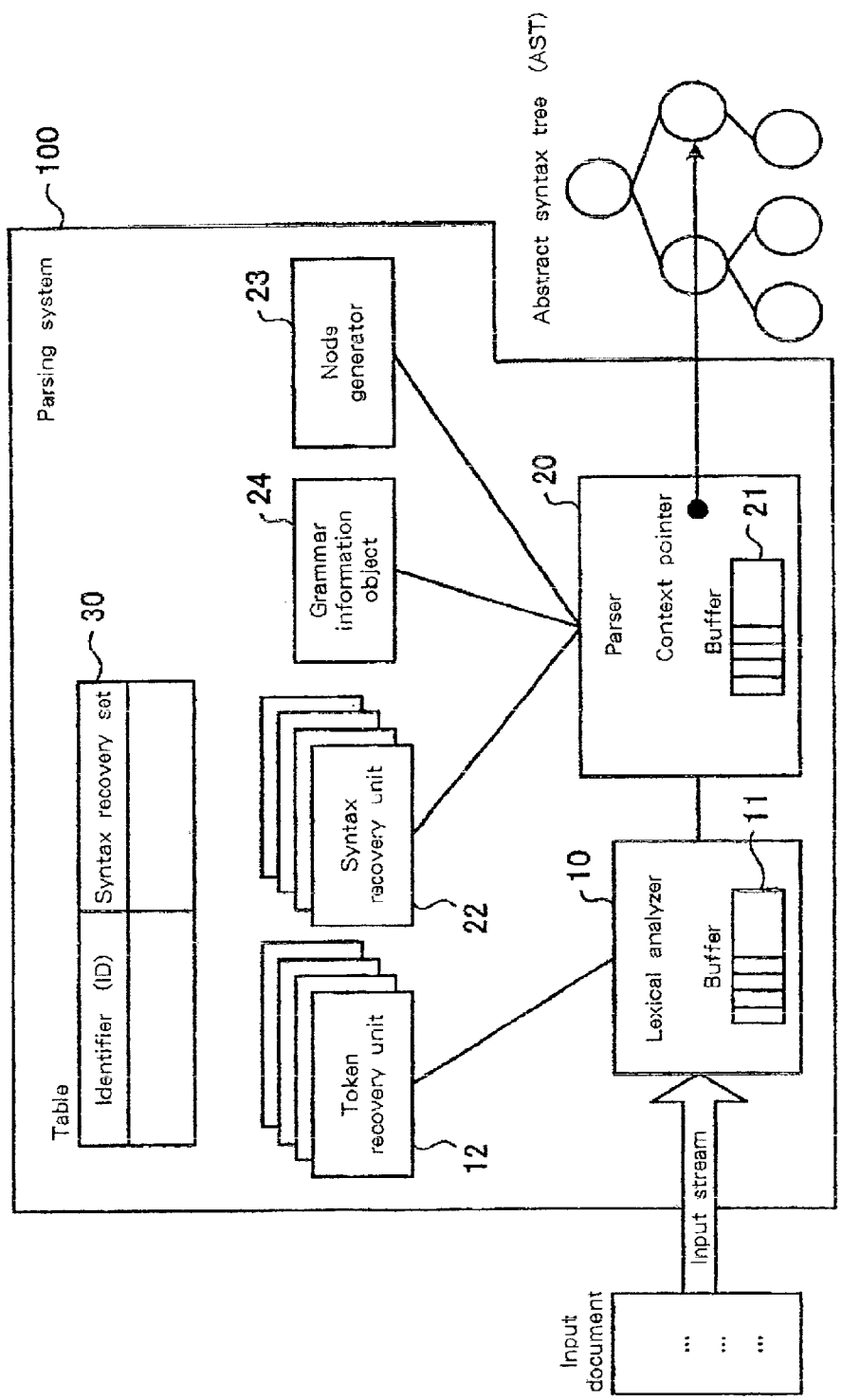
FIG. 1 is a diagram showing the general configuration of a parsing system according to one embodiment of the invention.

FIG. 1 is a diagram showing the general configuration of a parsing system according to the embodiment of the invention. In FIG. 1, a parsing system 100 for this embodiment comprises: a lexical analyzer 10, for performing token analysis for a predetermined stream in an input document; token recovery units 12, for correcting an error in a token; a parser 20, for parsing a token obtained from the lexical analyzer 10 and generating and outputting an abstract syntax tree (AST) describing the structure of the input document; syntax recovery units 22, for correcting errors in accordance with syntax rules; a table 30 used by the syntax recovery units 22 to designate one of them for use; and a node generator 23, for generating the abstract syntax tree. When the parser 20 initiates the process, a grammar information object 24 used for the parsing is generated. The lexical analyzer 10 further includes buffers 11, which are used for the token analysis process, and the parser 20 includes buffers 21 and a context pointer, which is used for the parsing process.

In FIG. 1, the lexical analyzer 10, the token recovery units 12, the parser 20, the syntax recovery units 22, the node generator 23 and the grammar information object 24 are virtual software blocks implemented by a CPU under the control of a computer program. Specifically, the token recovery units 12 and the syntax recovery units 22 can be arbitrarily prepared, added, changed or deleted as program modules by a user of the parsing system 100. The computer program controlling the CPU is stored on a storage medium, such as a CD-ROM or a floppy disk, or is transmitted via a network.

Figure 11:
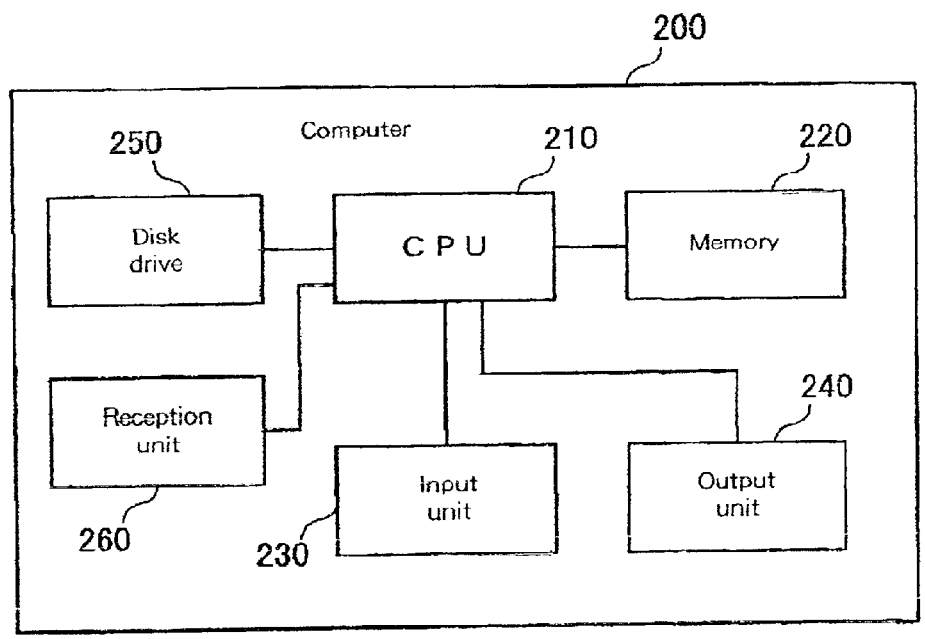
FIG. 11 is a diagram for explaining the arrangement of a computer in which the parsing system of the embodiment is mounted.
Figure 12:
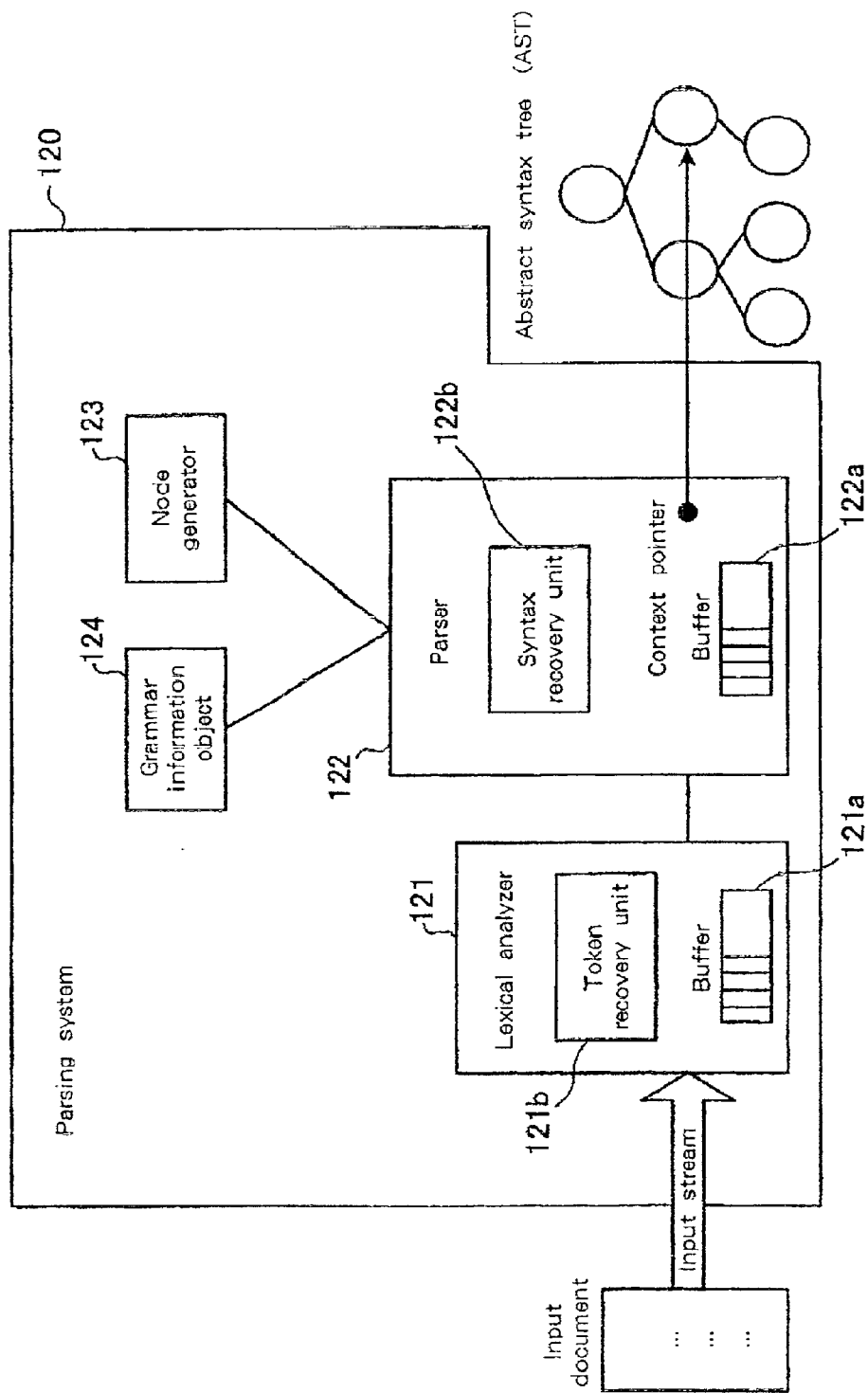
FIG. 12 is a diagram showing the configuration of a conventional parsing system.
Figure 13:
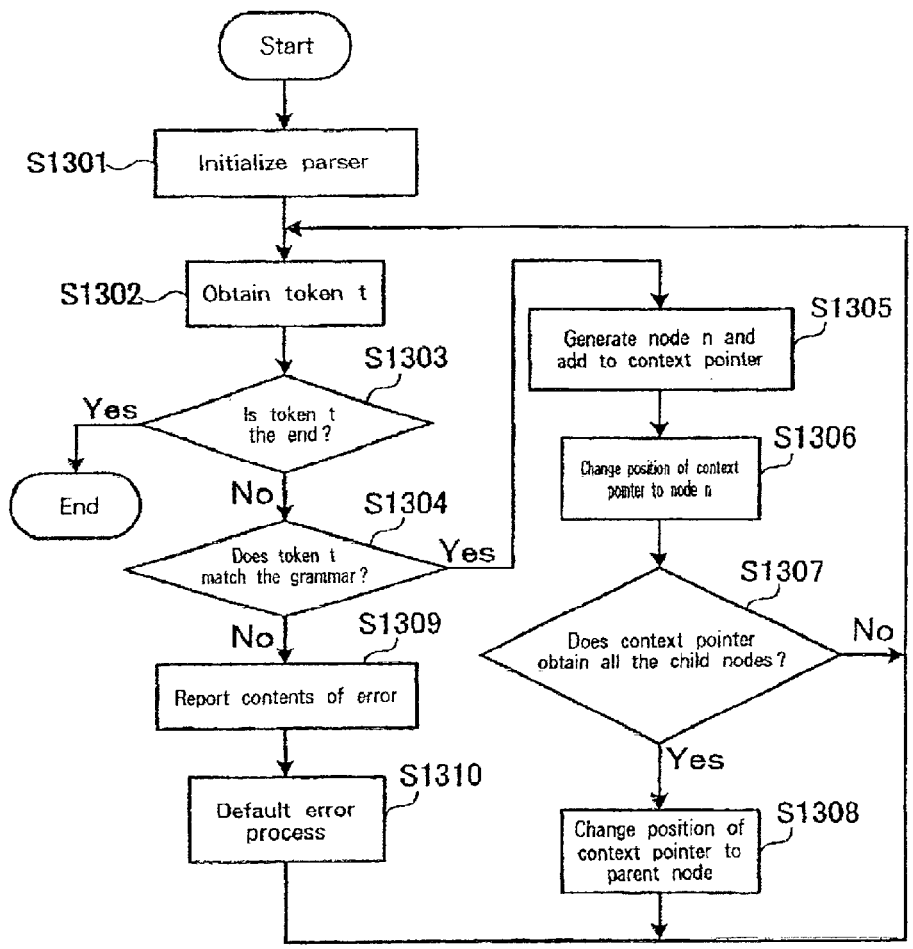
FIG. 13 is a flowchart for explaining the parsing processing performed by the conventional parsing system in FIG. 12.

FIG. 11 is a diagram for explaining an example arrangement for a computer in which the parsing system 100 of this embodiment is mounted.

In FIG. 11, a computer 200 comprises: a CPU 210; memory 220, in which a computer program is stored that controls the CPU 210 for implementing the individual components of the parsing system 100 in FIG. 1; an input unit 230, for receiving a target document; and an output unit 240, for outputting the parsing results obtained for the input document. The computer 200 further comprises: a disk drive 250, for reading the computer program that implements the parsing system 100 from a CD-ROM or a floppy disk; and a reception unit 260, for receiving the computer program via a network.

The computer 200 is used as a conversion system (converter) for converting a document, for example, from an HTML document into a WML (Wireless Markup Language) document.

The computer 200 operates the parsing system 100 to initiate the parsing of the original document before the conversion of the document form. When the computer 200 is used as the conversion system, the computer 200 further comprises a converter (not shown) for converting the form of the input document based on the output of the output unit 240 (as will later be described in this embodiment, since the parsing system 100 corrects errors in a token in the input document and errors in accordance with syntax rules, the output results are those obtained by error correction).

For the parsing system 100 of this embodiment, the syntax recovery units 22 are provided independent of the parser 20 as means for correcting errors in the input document based on the syntax rules. Each of the syntax recovery units 22 has a simple function for correcting a specific syntax rule error, and during the parsing process, various syntax rule errors can be coped with by using a combination of these syntax recovery units 22.

The combination of syntax recovery units 22 to be used is determined in accordance with the type of target document. An appropriate reference may be established in advance, or experience gained during an actual parsing episode may be employed to determine what combination of syntax recovery units 22 should be used for a specific type of input document. Further, references for the sorting of an input document type can be arbitrarily determined by the user of the parsing system 100.

For example, when a markup language document, such as an SGML document, is an input document, it can be sorted based on the DTD (Document Type Definition) that is used to describe the document form.

Furthermore, documents can be sorted in more detail. For example, assume that an HTML document (a web page) is an input document, and that at a certain site a specific process is performed for HTML documents. Assume further that because of a characteristic of a program that is used when processing HTML documents at that site, it has been observed that during the processing one syntax rule error occurs repeatedly. In this case, the results obtained at this site when HTML documents are processed, the frequent occurrences of the same syntax rule error, may suffice to establish a trend, and thus, a corresponding combination of syntax recovery units 22 can be established for the processing of an HTML document that fits the category represented by the above described input document.

Subsequently, the combination of syntax recovery units 22 that is established is registered in the table 30 in correlation with a document ID representing a document type, so that thereafter, when a parsing process is initiated for an input document, the table 30 can be examined, using as a key a document ID corresponding to the input document, and the appropriate combination of syntax recovery units 22 can be selected for use.

In this embodiment, the same relationship as exists between the syntax recovery units 22 and the parser 20 is also established for the token recovery units 12 and the lexical analyzer 10. That is, the token recovery units 12, each of which has a simple function for correcting a specific error in a token, are provided independent of the lexical analyzer 10, and during token analysis processing, multiple token recovery units 12 can be jointly employed to cope with a variety of token errors.

However, since the token error types are limited to a degree, unlike the syntax recovery units 22 a combination of token recovery units 12 need not be prepared in accordance with the type of input document, and processing can be practically performed even when all the token recovery units 12 are always employed for an input stream. Therefore, means, such as the table 30, for holding information corresponding to the type of input document is not provided. However, means for holding information corresponding to the type of input document may be provided for the token recovery units 12, as well as for the syntax recovery units 22, and the processing may be performed by designating an appropriate combination of token recovery units 12 in accordance with an input document type.

The processing performed by the embodiment will now be described.

Figure 2:
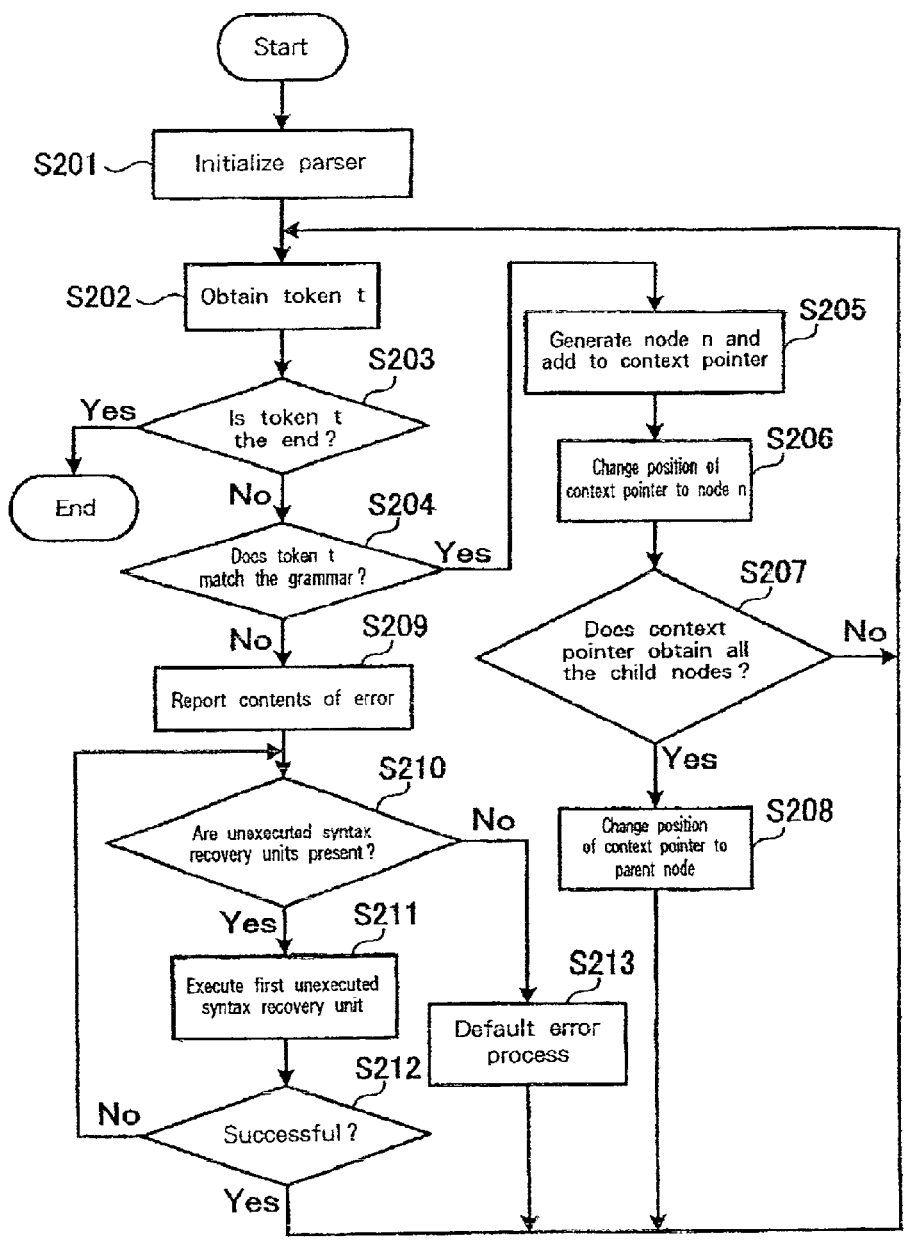
FIG. 2 is a flowchart for explaining the parsing processing performed by a parser according to the embodiment.

FIG. 2 is a flowchart for explaining the parsing processing performed by the parser 20 for this embodiment.

As is shown in FIG. 2, when the parsing process is initiated, first, the parser 20 is initialized (step 201). During this initialization process, as well as during the conventional process, ① a process for generating the grammar information object 24, ② a process for emptying the buffers 21 and ③ a process for permitting the context pointer to indicate the root node of the abstract syntax tree are performed. Furthermore, for use during the parsing process, a set of syntax recovery units 22 is obtained from the table 30 based on the type of input document.

First, however, before the initialization of the parser 20, the input of a stream and token analysis are completed. This processing, as it pertains to the operation of the lexical analyzer 10, will be described later.

The parser 20 extracts a token from the buffer 21 and defines it as a target token t (step 202). When the buffer 21 is empty (the buffer 21 is always empty immediately after it is initialized at step 201), the parser 20 requests a token from the lexical analyzer 10, and defines the obtained token as a token t. When, at step 203, the token t is the end of the input document, the parser 20 outputs the generated abstract syntax tree, and the parsing processing is thereafter terminated.

When the token t is not the end of the input document, the parser 20 inquires, of the grammar information object 24, whether the token t grammatically matches the context pointer. When the token t matches the context pointer, the token t is added to the context pointer (Yes at step 204). This addition is performed in the following manner. First, a node n to which a non-terminal symbol is appended is prepared by the node generator 23 and is added to the context pointer (step 205). Then, the point indicated by the context pointer is shifted to the newly added node n, to which the non-terminal symbol is appended (step 206). When the node n to which the non-terminal symbol is appended, which is pointed to by the context pointer, obtains all the child nodes, the context pointer is shifted and points to the parent node (steps 207 and 208). But if the node n to which the non-terminal symbol is appended, which is pointed to by the context pointer, does not obtain all the child nodes, or if the context pointer is shifted and points to the parent node at step 208, program control returns to step 202 and the preceding process is repeated for the next token.

If, at step 204, the token t does not grammatically match the context pointer, the parser 20 outputs an error message (step 209), and in accordance with a syntax rule, requests the syntax recovery units 22 for the correction of the error in the token t. During the processing for correcting the syntax rule error in the token t, an attempt is made to correct the error by sequentially using the syntax recovery units 22 that are set during the initialization for the parser 20 at step 201. For the use of the syntax recovery units 22, an arbitrary order can be established that is based, for example, on a priority level determined by employing an appropriate reference.

First, a check is performed to determine whether there are syntax recovery units 22 that have not yet been used (step 210). If there are such syntax recovery units 22, one of them is employed (step 211), and if the error is successfully corrected (step 212), program control returns to step 202 and the next token is processed.

If, however, the attempt to correct the error fails, program control returns to step 210, and another unused syntax recovery unit 22 is selected and employed. When at step 210 it is determined that all syntax recovery units 22 have been used, it is assumed that the syntax rule error in the token t can not be corrected by the syntax recovery units 22 that have been prepared for the input document, and a predetermined error process is performed (step 213) and program control is returned to step 202. The predetermined error process used in this case either is a process for skipping the token t and shifting to the processing to be performed for the next token, or a process during which the parser 20 provides an appropriate token t for the context pointer.

In the above processing, each of the syntax recovery units 22 corrects an error in the following manner.

First, a syntax recovery unit 22 receives from the parser 20, as additional information, the error type obtained by the analysis performed at step 204 and the target token t. The syntax recovery unit 22 then employs the additional information to determine whether the error can be corrected. If the syntax recovery unit 22 determines that the error can not be corrected, it passes the process to the next syntax recovery unit 22. When there is no next syntax recovery unit 22 remaining, the syntax recovery unit 22 notifies the parser 20 that correction of the error is impossible.

When the error can be corrected, the syntax recovery unit 22 resets the current abstract syntax tree, the buffer 21 of the parser 20 and the context pointer, and recovers the portion of the phase t whereat, in accordance with syntax rules, no error exists. Then, the syntax recovery unit 22 notifies the parser 20 that the correction was successfully performed.

Figure 3:
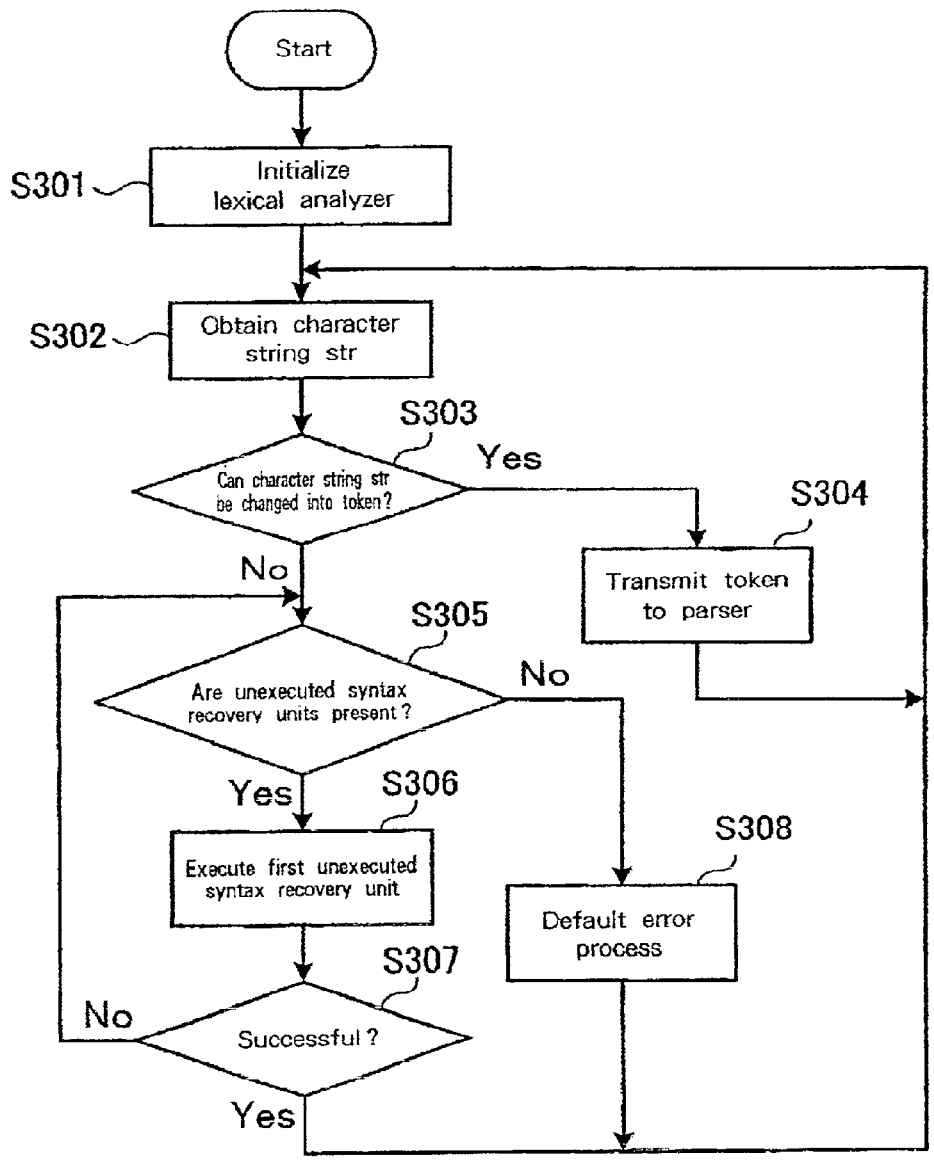
FIG. 3 is a flowchart for explaining the token analysis processing performed by a lexical analyzer according to the embodiment.

FIG. 3 is a flowchart for explaining the token analysis processing performed by the lexical analyzer 10 for this embodiment.

As is shown in FIG. 3, when the token analysis process is initiated, first, the lexical analyzer 10 is initialized (step 301). This process is performed by initializing the buffers 11. Further, at this time, by referring to the table 30, the token recovery unit 12 to be used is selected in accordance with the type of input document.

Upon the receipt of a request from the parser 20, the lexical analyzer 10 extracts a character string str from the buffer 11, changes it into a token, and transmits the token to the parser 20 (steps 302, 303 and 304). When the buffers 11 are empty (the buffers 11 are always empty immediately after they are initialized at step 301), the lexical analyzer 10 reads a character string str from the stream of the input document, analyzes the string str, and transmits it to the parser 20. Then, program control returns to step 302, whereat the lexical analyzer 10 is waiting for a token request from the parser 20, and processes the next character string str.

If at step 303 the character string str can not be formed into a token, the token recovery units 12 are sequentially employed to correct the character string str (steps 305, 306 and 307). A token recovery unit 12 replaces the character string str with a correct character string, stores the correct string in the buffer 11, and notifies the lexical analyzer 10 that the correction has been successfully completed. Program control then returns to step 302, whereat the lexical analyzer 10 is waiting for a token request from the parser 20, and processes the next character string str.

If the correction of the character string str can not be successfully completed by using all the token recovery units 12, the last token recovery unit 12 notifies the lexical analyzer 10 that the correction was not successfully concluded. The lexical analyzer 10 then performs a predetermined error process (step 308), and thereafter, program control is returned to step 302. The predetermined error process used in this case is a process whereby the current character string str is ignored and the process is switched to the next character string.

An error correction example for this embodiment will now be specifically explained.

In this example, an HTML parser, which is based on an SGML parser for generating a DOM (Document Object Model) to handle the content of a web page as an object, is employed as a specific system for the embodiment. The following syntax rule errors detected by the parsing system 100 are present in a markup language, such as SGML, and are defined as the error types that the parser 20 transmits to the syntax recovery unit 22.

1. Undefined Attribute

When, for example, there is start tag <BODY background="bg.gif">, the background attribute is not defined in HTML 4.0 Strict, and an error occurs (the background attribute is defined in HTML 3.2 or HTML 4.0 Transitional).

2. Non-corresponding End Tag (1) Case wherein a tag is positioned before the location whereat it is supposed to be For obtaining the nested structure with, for example, a portion <p>str0<b>str1<i>str2</b>str3</i>str4</p>, </b> must be positioned after </i>, and thus, an error occurs.

(2) Case wherein no corresponding start tag is present

For example, since start tag <tr> corresponding to </tr> is not present in portion <table>
<td> . . . </td><td> . . . </td></tr>
</table>, an error occurs. Further, when a start tag corresponding to </i> is present in portion <p>str0<b>str1<i>str2</b>str3</i>str4</p>, a start tag corresponding to </i>, which immediately follows str3, is not present since the syntax recovery unit 22 handling </b> understands that </i> should be located immediately before </b>, and an error occurs.

3. Incorrect Element (Element Grammatically Incorrect as the Child of a Context Pointer)

For example, for

<table>
<form>
<tr><td> . . . </td></tr>
<tr><td> . . . </td></tr>
</form>
</table>, since there is a rule that states FORM can not be entered immediately below TABLE, an error occurs.

Further, for

```
<a name="top">
    <p>
        . . . .
        <a href="page1.html">AnotherPage</a>
        . . . .
    </a>,
``` since there is a rule that states an anchor element can not be located below, the anchor element (tag </a>) is not accepted as an exception and an error occurs.

4. Undefined Element

Since, for example, a FONT element is not defined in HTML 4.0 Strict, an error occurs (the FONT element is defined in HTML 3.2 or HTML 4.0 Transitional).

The error correction processing will now be described by using an input document that includes a syntax rule error. In this explanation, documents A and B, each of which include a case (1) error wherein a non-corresponding end tag is positioned before a location whereat it is supposed to be, and a case (2) error wherein a corresponding start tag is not present, are employed as examples. In documents A and B, the positions of remarks "error 2. (1) occurred" and "error 2. (2) occurred" are those where the above errors are occurred.

```
document A:
<table>
    <tr>
        <td>
            <form action="./invention1.html">
                <input name="input1" size=5>
        </td>                    <!--error 2.    (1) occurred-->
        <td>
            <input type=submit>
            </form>              <!--error2.     (2) occurred-->
        </td>
    </tr>
</table>
document B
<table>
<tr><td><form                action="./invention1.html"><input
name="input1" size=5><input type=submit></td></tr>
<tr>
    <form>
        <td>
            <select>
                <option>
                .....
                <option>
            </select>
        </td>
    </form>
</tr>
</table>
<table>
<tr>
        <td>
            <select>
                <option>
                .....
                <option>
            </select>
        </td>
    </form>
</tr>
</table>
</form>                          <!--error 2.    (2) occurred-->
```

Figure 4:
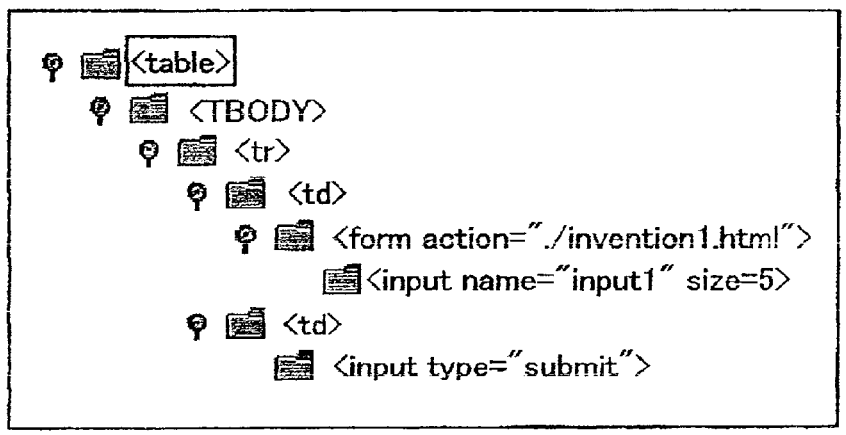
FIG. 4 is a diagram showing an abstract syntax tree that is obtained when the parser has performed the parsing process and a syntax recovery unit has not been used to correct an error.

FIG. 4 is a diagram showing the abstract syntax tree that is output after the parser 20 parses document A, without the syntax recovery unit 22 correcting the error.

In FIG. 4, an error has occurred in that the second INPUT element is not located under the FORM element. This is caused by a default process which was performed without the error correction being performed by the syntax recovery unit 22, according to which, if a corresponding TD element is closed upon the appearance of the first </td> tag in document A, the FORM element is also closed.

FIG. 5 is a diagram showing the abstract syntax tree that is output after the parser 20 parses document B, without the syntax recovery unit 22 correcting the error.

In FIG. 5, an error has occurred in that the second SELECT element is not located under the FORM element. This happened because, since the start tag <form> corresponding to the last </form> tag is not present in document B, the </form> tag is ignored and the process is terminated.

Assume that FormExpander and FormInserter are employed as the syntax recovery units 22 for correcting these errors concerning the FORM tag. The conditions for activating FormExpander and FormInserter, and the error correction operations (recovery operations) will now be described.

FormExpander

Activation condition: a condition wherein the token t that has caused an error is the end tag </form> of the FORM element, and wherein the FORM element can not be found by tracking the document from the current node indicated by the context pointer toward the root, and the token t is located before the context pointer.

Recovery Operation
1. The FORM element fe0 is searched for by scanning forward from the context pointer.
2. The FORM element fe0 is removed from the original position p0. This "removal" means that only the FORM element fe0 is removed while the child and grandchild nodes held by the pertinent node are not deleted, and the child and grandchild nodes are then added to the parent node of the FORM element fe0.
3. The FORM element fe0 is inserted into a position whereat covering the context pointer and the position p0 can be accomplished within the smallest range.
4. The context pointer is set to indicate the parent node of the FORM element fe0.

FormInserter

Activation condition: a condition wherein the token t that has caused an error is the end tag </form> of the FORM element, and wherein the FORM element can not be found by tracking the document from the current node indicated by the context pointer toward the root, and the token t is positioned before the location indicated by the context pointer.

Recovery Operation:
1. The FORM element fe1 is sought by searching forward from the location indicated by the context pointer.
2. The FORM element fe2 is created.
3. Among the nodes having the same parent node as has the node indicated by the context pointer, the nodes located following the FORM element fe1 are extracted from the parent node cp0 of the node indicated by the context pointer, and are added as child nodes to the FORM element fe2. This "extracting" differs from the above "removing", and a tree segment that includes the child and grandchild nodes of the pertinent node is removed.
4. The FORM element fe2 is added to the node cp0.
5. The context pointer is set to indicate the node cp0.

As is described above, FormExpander and FormInserter have the same activation condition. That is, when an error on the syntax rule that matches the above activation condition is detected in the input document, either FormExpander or FormInserter is selectively employed to correct the error.

FIG. 6 is a diagram showing the abstract syntax tree that is output after the parser 20 parses document A for which FormExpander corrected the error.

In FIG. 6, it is found that, while a problem exists in that the FORM element is located under the TR element, the two INPUT elements are located under the FORM element.

Figure 7:
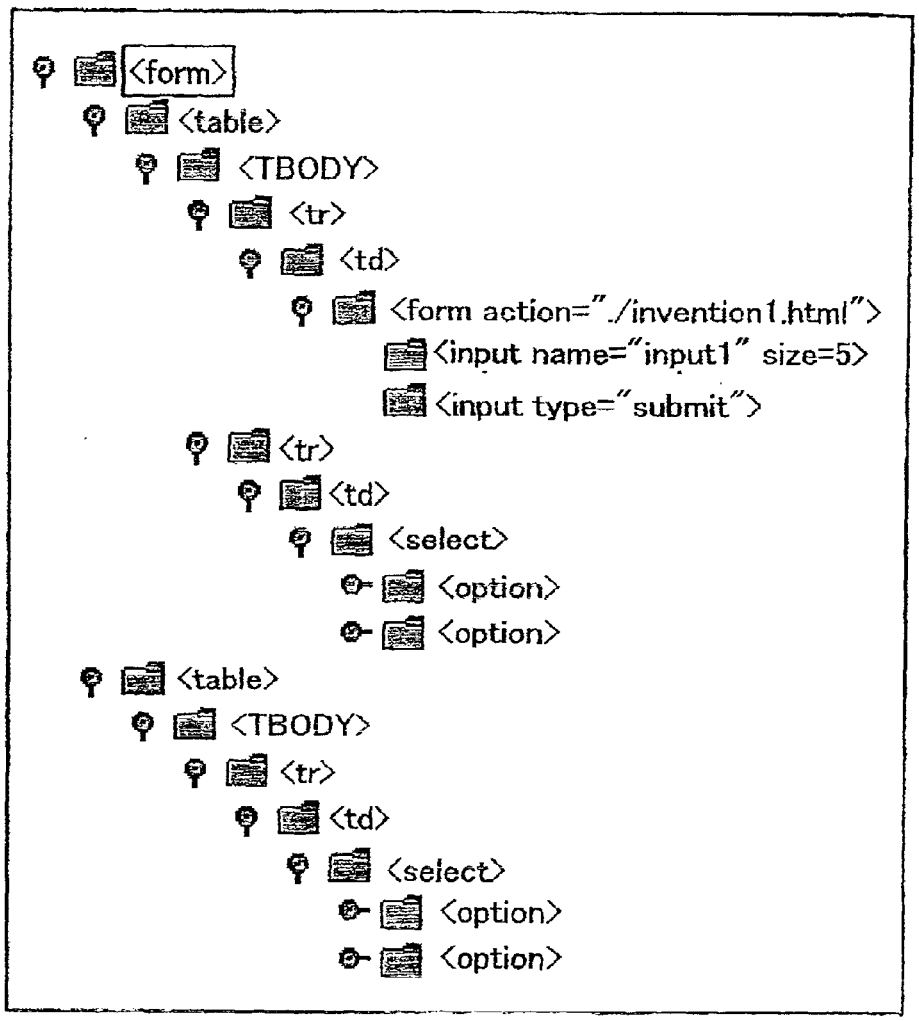
FIG. 7 is a diagram showing another abstract syntax tree that is obtained when the parser has performed the parsing process and a syntax recovery unit has been used to correct an error.

FIG. 7 is a diagram showing the abstract syntax tree that is output after the parser 20 parses document B for which FormExpander corrected the error.

In FIG. 7, the second SELECT element can be located under the FORM element; however, this is pertinent to an exception whereby the FORM element is located under the FORM element.

FIG. 8 is a diagram showing the abstract syntax tree that is output after the parser 20 parses document A for which FormInserter corrected the error.

In FIG. 8, the two INPUT elements, which should originally have been located under the same FORM element, are located under different FORM elements.

FIG. 9 is a diagram showing the abstract syntax tree that is output after the parser 20 parses document B for which FormInserter corrected the error.

In FIG. 9, it is found that the two SELECT elements are located under the FORM element, and the FORM element does not include a FORM element.

While referring to the results obtained using FormExpander and FormInserter, it is apparent that for correcting the error in document A FormExpander is more appropriate, and that for correcting the error in document B FormInserter is more appropriate. Therefore, it is preferable that these syntax recovery units 22 be selected and used for parsing document A and for parsing document B.

Figure 10:
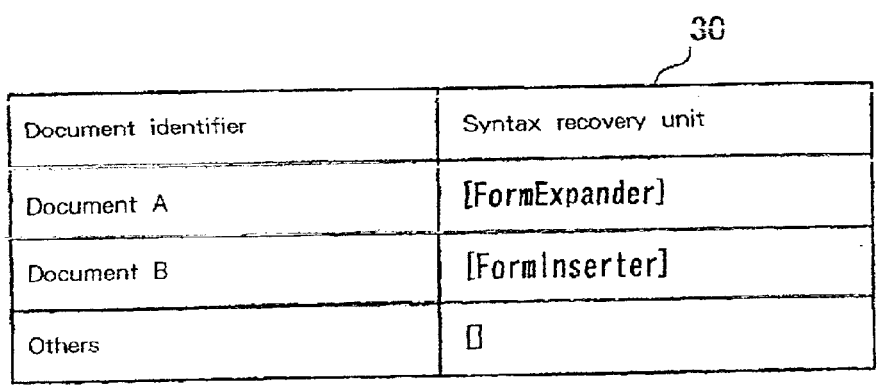
FIG. 10 is a diagram showing a table used to select an appropriate syntax recovery unit according to the embodiment.

FIG. 10 is a diagram showing the table 30 used to select an appropriate syntax recovery unit 22 for the above operations.

In FIG. 10, document A and document B are registered as the document identifiers (actually, predetermined IDs for identifying documents A and B are registered), FormExpander is entered as the syntax recovery unit 22 for document A, and FormInserter is entered as the syntax recovery unit 22 for document B.

Thus, for parsing document A, when the parser 20 is initialized, the ID of document A is used as a key to establish the user of FormExpander as the syntax recovery unit 22. Similarly, for parsing document B, when the parser 20 is initialized, the ID of document B is used as a key to establish the user of FormInserter as the syntax recovery unit 22. The error in the input document A or B can be corrected by using the appropriate syntax recovery unit 22, and the optimal output results (abstract syntax tree) can be obtained.

The syntax recovery unit 22 for correcting the error concerning the FORM tag has been explained. Next, several other different types of syntax recovery units 22 will be explained. The following syntax recovery units 22 are those used for parsing an HTML document; however, some of the syntax recovery units 22 can also be used for an SGML document or an XML document, or can be generalized for common use.

DefaultErrorHandler

Activation condition: a condition wherein the error type is an incorrect element (the above described error type 3), and where the correct position whereat the element that has caused the error appears is fixed. This "fixed" means that the position of the element is fixed under the non-repetitive parent element by the DTD (Document Type Definition). For example, the HEAD element under the HTML element is pertinent.

Recovery Operation
1. The element e2 having the same name as the incorrect element e1 is searched for.
2. A check is performed to determine whether the element e2 has been supplemented through a process performed by another syntax recovery unit 22 or by the parser 20.
3. The element e2 is replaced with the element e1 when the element e2 is a supplemented element.

Since this syntax recovery unit 22 is independent of the HTML, this can be used for an SGML document and an XML document.

InterleaveEndtagExchanger

Activation condition: a condition wherein the error type is a non-corresponding end tag, and this tag is located before the original position (error type 2 (1)).

Recovery Operation
1. The parent node of the node indicated by the context pointer is substituted into the variable e1 that indicates the element.
2. It is ascertained that the correction is disabled when the variable e1 is the same as a non-corresponding end tag et0 that has caused the error, and the processing is terminated (recovery failure).
3. A backward search from the buffer 21 of the parser 20 is performed for the end tag et1, having the same name as the variable e1 when the variable e1 is not the same as the non-corresponding end tag et0, and when the end tag can not be omitted.

4. The non-corresponding end tag et0 is inserted into the position in the buffer 21 of the parser 20 wherein the element et1 was placed, and the end tag et1 is inserted into the head of the buffer 21 when the end tag et1 is found as a result of step 3.
5. The variable e1 is changed to the parent node of the variable e1, and program control returns to step 2 when the end tag et1 can not be found at step 3. Since this syntax recovery unit 22 is provided independent of the HTML, it can be employed for an SGML document and an XML document.

RangeExpander

Activation condition: a condition wherein the error type is a non-corresponding end tag, and this tag is located before the original position (error type 2 (1)).

Recovery Operation

1. The context pointer is substituted into the variable e1 that indicates the element, and a variable array of the element array type is prepared.
2. A check is performed to determine whether the variable e1 has the same name as the non-corresponding end tag et0 that caused the error. If the two are not the same name, the processes at step 3 and 4 are repeated until the variable e1 has the same name as the non-corresponding end tag et0.
3. The node generator 23 generates the element having the same name as the variable e1, and inserts it at the end of the variable array prepared at step 1 when the end tag can not be omitted for the variable e1.
4. The variable e1 is shifted toward the element e1, and program control returns to step 2.
5. Whether the variable array is empty is determined when, at step 2, the variable e1 has the same name as the non-corresponding end tag et0 that caused the error. If the variable array is not empty, the process at step 6 is repeated until the variable array is emptied.
6. The element e2 is extracted from the head of the variable array, and is added to the context pointer. The point indicated by the context pointer is changed to the element e2.

Since this syntax recovery unit 22 is provided independent of the HTML, it can be employed for an SGML document and an XML document.

AnchorUnderAnchorHandler

Activation condition: a condition wherein the error type is an incorrect element (error type 3), and wherein the element a1 that caused an error is an anchor and the element a2, the anchor, is also located above the node indicated by the context pointer.

Recovery Operation

The element a1 is added as the node having the same parent node as the element a2, and the point indicated by the context pointer is changed to the element a1.

When an error has occurred whereof the element de below the element ue is an exception, this syntax recovery unit 22 can be generalized as a recovery method for changing the upper element de to the node having the same parent node as the lower element ue. Thus, this syntax recovery unit 22 can be also used for an SGML document and an XML document.

FramesetErrorHandler

Activation condition: a condition wherein the error type is an undefined element (error type 4) and the element e1 that caused the error is FRAMESET.

Recovery Operation

1. The element e1 is returned to the buffer 21 of the parser 20.
2. The grammar information object 24 used by the parser 20 is changed to the HTML 4.0 Frameset that defines FRAMESET. This syntax recovery unit 22 can be generalized for use as a method for setting the grammar information object 24 for the document type definition DTD2 that defines the element e2 for the undefined element e2. Thus, the syntax recovery unit 22 can also be used for an SGML document and an XML document. The document type definition DTD2 may be clearly designated by the user or may be searched for in the repository of the DTD.

HTMLErrorHandler

Activation condition: a condition wherein the error type is an incorrect element (error type 3), and the name of the element e1 that caused the error is either LINK, STYLE, META, BASE or ISINDEX.

Recovery Operation

The HEAD element is searched for from the child node of the HTML element that is the root node of the output result AST, and the element e1 is added to the node of the HEAD element.

This syntax recovery unit 22 is inherent to the HTML.

IgnoreFont

Activation condition: a condition wherein the error type is an incorrect element (error type 3), and the name of the element e1 that caused the error is FONT.

Recovery Operation

No process is performed, and the element e1 is ignored.

This syntax recovery unit 22 can be generalized for use for an SGML document and an XML document.

TRErrorHandler

Activation condition: a condition wherein the error type is an incorrect element (error type 3), and the name of the element e1 that caused the error is TD.

Recovery Operation

The TR element tr is newly prepared and is added to the context pointer when the point indicated by the context pointer is the TBODY element or the TABLE element. Also, the element e1 is added to the element tr, and the point indicated by the context pointer is set to the element e1.

An example will be presented for the token recovery unit 12.

Since, for the token analysis, only whether a character string is pertinent to the token of a predetermined tag is determined, and not many types of token recovery units are provided, only an explanation for a representative token recovery unit will now be given.

AttributeValueErrorHandler

Activation condition: a condition wherein a character string " . . . > . . . < . . . " appears during the token analysis for the attribute value in a start tag.

Recovery Operation

The character string " . . . > . . . <. . . " is inserted into the buffer 11 of the lexical analyzer 10.

In the above explanation, a target document written in a markup language, especially an HTML document, has been employed. However, when a recovery means is prepared in accordance with a token rule in a different programming language, or in a natural language, and a syntax rule, the present invention can be applied unchanged for the parsing of a document written in the different programming language or in the natural language.

Further, the parsing system of the invention can also be used as a structure recovery system for analyzing the structure of a data string, other than the above program or document, that is written in accordance with a predetermined rule, such as a musical score, and for correcting an error in a data string.

In this case, the structure recovery system comprises: analysis means (corresponding to the parser 20 in this embodiment), for analyzing the structure of the data string and detecting an error in accordance with the rule; and recovery means (corresponding to a set of the syntax recovery units 22 in this embodiment), upon the receipt of a request from the analysis means, provided independent of the analysis means, for correcting an error detected from the data string in accordance with the rule, wherein the recovery means includes a plurality of correction means (the individual syntax recovery units 22 in this embodiment), each of which have a simple function for correcting a specific type of error. When, according to the rule, the correction means is selectively employed in accordance with the error type of the data string, a variety of errors in the data string can be corrected.

As is described above, according to the invention, multiple recovery means are prepared in accordance with the type of error in a token or in accordance with the syntax rule for a data string, such as the program or the document, and are selectively employed to correct the error.

What is claimed is:

1. A structure recovery system comprising: analysis means for analyzing the structure of a data string written in accordance with a predetermined rule, said rule comprising:
   a) generating a grammar information object;
   b) emptying buffers to receive a data string;
   c) causing a context pointer to indicate a root node of an abstract syntax tree;
   d) obtaining a set of syntax recovery units;
   e) inputting a data string comprising a stream of tokens to the buffers;
   f) extracting a token from the buffer as a target token; and when the target token is the end of the data string generating and outputting an abstract data tree, and for detecting an error in accordance with said predetermined rule by a method further comprising receiving a non-terminal token, determining from the grammar information object if the token matches a context pointer, and if so adding the token to the context pointer by the steps of:
   a) adding a node to which the terminal token is appended to the context pointer;
   b) shifting the point indicated by the by the context pointer to the newly added node to which the non-terminal token is appended;
   c) repeating steps a) and b) for all child nodes;
   d) shifting the context pointer to the parent node; and
   e) obtaining a next token if the node does not contain all child nodes or if the context pointer points back to a parent node; and recovery means for, upon the receipt of a request from said analysis means, correcting in accordance with said predetermined rule said error detected in said data string by said analysis means, wherein said recovery means includes a set of syntax recovery units that individually employ simple functions for correcting specific types of errors, and wherein said recovery means selectively employs said syntax recovery means based on the error type in accordance with said predetermined rule in order to correct a variety of errors in said data string by a method further comprising sequentially using syntax recovery units where a syntax recovery unit receives an error message if a token does not grammatically match the syntax pointer, and the syntax recovery unit sequentially passing the error to a subsequent syntax recovery unit until a syntax recovery unit matching the error type is found, said syntax recovery unit a) resetting the current abstract syntax tree, buffer, and context pointer;
   b) recovering a pointer where in accordance with said syntax rules no error exists; and
   c) notifying the parser that the correction was successfully applied.

2. The parsing system according to claim 1, wherein multiple types of said syntax recovery units are prepared in accordance with the types of errors that are detected by said parser in said data string, and each of said syntax recovery units has a function for correcting a specific type of error.

3. The parsing system according to claim 2, further comprising: corresponding information storage means for storing information that correlates the type of data string with a syntax recovery unit for recovering from an error in said data string, wherein, in accordance with the type of target data string, said parser employs said information stored in said corresponding information storage means to set up said syntax recovery unit for the correction of an error upon the receipt of a request.

4. The parsing system according to claim 2, wherein, when said target data string includes an element that is not defined by a rule that said parser employs for said parsing process, at least one of said syntax recovery units is activated and performs a process for replacing said rule used by said parser with a rule that defines said element in said target data string, and for returning said target data string to said parser.

5. The parsing system according to claim 1, further comprising: a lexical analyzer, for performing token analysis for said target data string; and a token recovery unit, for correcting an error detected by said lexical analyzer in said token in said data string, wherein said token recovery unit can change the contents of a correction.

6. The parsing system according to claim 5, wherein multiple types of said token recovery units are prepared in accordance with the type of error that is detected by said lexical analyzer in said data string, and each has a function for correcting a specific type of error.

7. A system for converting a data string in a predetermined form into a data string in another form comprising: an analyzer for analyzing said data string; said analyzer comprising
   a) means generating a grammar information object;
   b) means for emptying buffers to receive a data string into the system;
   c) means for causing a context pointer to indicate a root node of an abstract syntax tree;
   d) means for obtaining a set of syntax recovery units;
   e) means for inputting a data string comprising a stream of tokens to the buffers of the system:
   f) means for extracting a token from the buffer as a target token; and means when the target token is the end of the data string for generating and outputting an abstract data tree, means for detecting an error in accordance with said predetermined rule by a method further comprising receiving a non-terminal token, determining from the grammar information object if the token matches a context pointer, and if so adding the token to the context pointer by the steps of:
   a) adding a node to which the terminal token is appended to the context pointer;
   b) shifting the point indicated by the by the context pointer to the newly added node to which the non-terminal token is appended;

c) repeating steps a) and b) for all child nodes;

d) shifting the context pointer to the parent node; and e) obtaining a next token if the node does not contain all child nodes or if the context pointer points back to a parent node;

a recovery means comprising a set of syntax recovery units that individually employ simple functions for correcting specific types of errors, and wherein said recovery means selectively employs said syntax recovery means based on the error type in accordance with said predetermined rule in order to correct a variety of errors in said data string by a method further comprising sequentially using syntax recovery units where a syntax recovery unit receives an error message if a token does not grammatically match the syntax pointer, and the syntax recovery unit sequentially passing the error to a subsequent syntax recovery unit until a syntax recovery unit matching the error type is found, said syntax recovery unit a) resetting the current abstract syntax tree, buffer, and context pointer;

b) recovering a pointer where in accordance with said syntax rules no error exists; and c) notifying the parser that the correction was successfully applied, said syntax recovery unit upon the receipt of a request from said analyzer, correcting an error detected in said data string by said analyzer; and a converter, for changing a data form in accordance with the results obtained by said analyzer, wherein multiple types of said recovery units are prepared in accordance with the type of error that is detected by said analyzer in said data string, and each has a function for correcting a specific type of error.

8. The conversion system according to claim 7, wherein said analyzer is a parsing means for parsing said data string, and said recovery unit is syntax recovery means for correcting an error in said data string in accordance with a syntax rule.

9. A computer comprising: an input unit for receiving a data string written in accordance with a predetermined rule, said rule comprising:

a) generating a grammar information object;

b) emptying buffers to receive a data string;

c) causing a context pointer to indicate a root node of an abstract syntax tree;

d) obtaining a set of syntax recovery units;

e) inputting a data string comprising a stream of tokens to the buffers;

f) extracting a token from the buffer as a target token; and when the target token is the end of the data string generating and outputting an abstract data tree; a processor for processing said data string by using a function implemented by program control; and an output unit for outputting said data string obtained by said processor, wherein said processor includes an analyzer for analyzing said data string including receiving a non-terminal token, determining from the grammar information object if the token matches a context pointer, and if so adding the token to the context pointer by the steps of:

a) adding a node to which the terminal token is appended to the context pointer;

b) shifting the point indicated by the by the context pointer to the newly added node to which the non-terminal token is appended;

c) repeating steps a) and b) for all child nodes;

d) shifting the context pointer to the parent node; and e) obtaining a next token if the node does not contain all child nodes or if the context pointer points back to a parent node; and a syntax recovery unit, for, upon the receipt of a request from said analyzer, correcting an error detected in said data string by said analyzer, and wherein multiple types of said syntax recovery units are prepared in accordance with the type of error that is detected by said analyzer in said data string, and each has a function for correcting a specific type of error wherein said recovery means includes a set of syntax recovery units that individually employ simple functions for correcting specific types of errors, and wherein said recovery means selectively employs said syntax recovery units based on the error type in accordance with said predetermined rule in order to correct a variety of errors in said data string by a method further comprising sequentially using syntax recovery units where a syntax recovery unit receives an error message if a token does not grammatically match the syntax pointer, and the syntax recovery unit sequentially passing the error to a subsequent syntax recovery unit until a syntax recovery unit matching the error type is found, said syntax recovery unit a) resetting the current abstract syntax tree, buffer, and context pointer;

b) recovering a pointer where in accordance with said syntax rules no error exists; and c) notifying the parser that the correction was successfully applied.

10. The computer according to claim 9, wherein said analyzer is a parsing means for parsing said data string, and said recovery unit is syntax recovery means for correcting an error in said data string in accordance with a syntax rule.

11. A parsing method for parsing a data string written in accordance with a predetermined rule comprising the steps of: selecting a program module used to correct an error in a target data string in accordance with a syntax rule; parsing said data string by inputting a data string comprising a stream of tokens to associated buffers and extracting a token from the buffer as a target token, and when the target token is the end of the data string generating and outputting an abstract data tree, and detecting an error in accordance with said predetermined rule by receiving a non-terminal token, determining from the grammar information object if the token matches a context pointer, and if so adding the token to the context pointer, and otherwise issuing a correction request to said program module when said parsing detects an error in accordance with said syntax rule in said data string by the steps of:

a) adding a node to which the terminal token is appended to the context pointer;

b) shifting the point indicated by the by the context pointer to the newly added node to which the non-terminal token is appended;

c) repeating steps a) and b) for all child nodes;

d) shifting the context pointer to the parent node; and e) obtaining a next token if the node does not contain all child nodes or if the context pointer points back to a parent node; and recovery means for, upon the receipt of a request from said analysis means, correcting in accordance with said predetermined rule said error detected in said data string by said analysis means, wherein said recovery means includes a set of syntax recovery units that individually employ simple functions for correcting specific types of errors; and correcting said error using said program module by the steps of employing correction means based on the error type in accordance with the predetermined rule comprising sequentially using syntax recovery units where a syntax recovery unit receives an error message if a token does not grammatically match the syntax pointer, and the syntax recovery unit sequentially passes the error to a subsequent syntax recovery unit until a syntax recovery unit matching the error type is found, said syntax recovery unit a) resetting the current abstract syntax tree, buffer, and context pointer;

b) recovering a pointer where in accordance with said syntax rules no error exists; and c) notifying the parser that the correction was successfully applied, and parsing the obtained data.

12. The parsing method according to claim 11, wherein said step of selecting a program module for use includes the steps of: examining the type of said target data string; and employing said type of said target data string to select said program module based on a correlation that is defined in advance.

13. The parsing method according to claim 11, further comprising the step of: replacing, upon the receipt of an instruction from said program module to which said correction request has been issued, a rule used for said parsing with a different rule, wherein, at said step of performing said parsing for the resultant data string, said parsing is performed for said data string written in accordance with said different rule.

14. A storage medium on which input means of a computer stores a computer-readable program product that permits said computer to perform: analysis means for analyzing said data string; and recovery means, for, upon the receipt of a request from said analysis means, correcting an error detected in said data string by said analysis means, and wherein multiple types of said recovery means are prepared in accordance with the type of error that is detected by said analysis means in said data string, and each has a function for correcting a specific type of error said computer readable program causing a computer to a) generate a grammar information object;

b) empty buffers to receive a data string;

c) cause a context pointer to indicate a root node of an abstract syntax tree;

d) obtain a set of syntax recovery units;

e) input a data string comprising a stream of tokens to the buffers;

f) extract a token from the buffer as a target token; and when the target token is the end of the data string generating and outputting an abstract data tree; and for detecting an error in accordance with a predetermined rule by a method further comprising receiving a non-terminal token, determining from the grammar information object if the token matches a context pointer, and if so adding the token to the context pointer by the steps of:

a) adding a node to which the terminal token is appended to the context pointer;

b) shifting the point indicated by the by the context pointer to the newly added node to which the non-terminal token is appended;

c) repeating steps a) and b) for all child nodes;

d) shifting the context pointer to the parent node; and e) obtaining a next token if the node does not contain all child nodes or if the context pointer points back to a parent node; and recovery means for, upon the receipt of a request from said analysis means, correcting in accordance with said predetermined rule said error detected in said data string by said analysis means, wherein said recovery means includes a set of syntax recovery units that individually employ simple functions for correcting specific types of errors, and wherein said recovery means selectively employs said syntax recovery units based on the error type in accordance with said predetermined rule in order to correct a variety of errors in said data string by a method further comprising sequentially using syntax recovery units where a syntax recovery unit receives an error message if a token does not grammatically match the syntax pointer, and the syntax recovery unit sequentially passing the error to a subsequent syntax recovery unit until a syntax recovery unit matching the error type is found, said syntax recovery unit a) resetting the current abstract syntax tree, buffer, and context pointer;

b) recovering a pointer where in accordance with said syntax rules no error exists; and c) notifying the parser that the correction was successfully applied.

15. A program transmission apparatus comprising: storage means for storing a program product that permits a computer to perform analysis means for analyzing said data string, and recovery means, for, upon the receipt of a request from said analysis means, correcting an error detected in said data string by said analysis means; and transmission means for reading said program product from said storage means and transmitting said program product, wherein multiple types of said recovery means are prepared in accordance with the type of error that is detected by said analysis means in said data string, and each has a function for correcting a specific type of error said program product causing a computer to a) generate a grammar information object;

b) empty buffers to receive a data string;

c) cause a context pointer to indicate a root node of an abstract syntax tree;

d) obtain a set of syntax recovery units;

e) input a data string comprising a stream of tokens to the buffers;

f) extract a token from the buffer as a target token; and when the target token is the end of the data string generating and outputting an abstract data tree, and for detecting an error in accordance with said predetermined rule by a method further comprising receiving a non-terminal token, determining from the grammar information object if the token matches a context pointer, and if so adding the token to the context pointer by the steps of:

a) adding a node to which the terminal token is appended to the context pointer;

b) shifting the point indicated by the by the context pointer to the newly added node to which the non-terminal token is appended:

c) repeating steps a) and b) for all child nodes;

d) shifting the context pointer to the parent node; and e) obtaining a next token if the node does not contain all child nodes or if the context pointer points back to a parent node; and recovery means for, upon the receipt of a request from said analysis means, correcting in accordance with said predetermined rule said error detected in said data string by said analysis means, wherein said recovery means includes a set of syntax recovery units that individually employ simple functions for correcting specific types of errors, and wherein said syntax recovery means selectively employs said syntax recovery units based on the error type in accordance with said predetermined rule in order to correct a variety of errors in said data string by a method further comprising sequentially using syntax recovery units where a syntax recovery unit receives an error message if a token does not grammatically match the syntax pointer, and the syntax recovery unit sequentially passes the error to a subsequent syntax recovery unit until a syntax recovery unit matching the error type is found, said syntax recovery unit a) resetting the current abstract syntax tree, buffer, and context pointer;

b) recovering a pointer where in accordance with said syntax rules no error exists; and c) notifying the parser that the correction was successfully applied.

* * * * *